United States Patent
Cheng et al.

(10) Patent No.: US 7,848,290 B2
(45) Date of Patent: Dec. 7, 2010

(54) METHOD AND SYSTEM FOR FORWARD LINK CELL SWITCHING APPROACH WITHOUT ABIS TRAFFIC FLOODING

(75) Inventors: Mark W. Cheng, San Diego, CA (US); Liangchi (Alan) Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 1163 days.

(21) Appl. No.: 10/311,893

(22) PCT Filed: Apr. 24, 2002

(86) PCT No.: PCT/IB02/01357

§ 371 (c)(1), (2), (4) Date: Jul. 30, 2004

(87) PCT Pub. No.: WO02/101966

PCT Pub. Date: Dec. 19, 2002

(65) Prior Publication Data

US 2004/0246917 A1    Dec. 9, 2004

(51) Int. Cl.
*H04W 4/00* (2009.01)
*H04W 36/00* (2009.01)
*H04W 72/00* (2009.01)

(52) U.S. Cl. .................. 370/331; 370/328; 370/332; 370/338; 455/436; 455/437

(58) Field of Classification Search ............... 370/328, 370/331, 332, 329, 333, 338; 455/432.1–453
See application file for complete search history.

(56) References Cited

U.S. PATENT DOCUMENTS

| | | | |
|---|---|---|---|
| 5,101,501 A * | 3/1992 | Gilhousen et al. | 455/442 |
| 5,594,718 A * | 1/1997 | Weaver et al. | 370/331 |
| 5,953,325 A | 9/1999 | Willars | |
| 6,075,989 A * | 6/2000 | Moore et al. | 455/436 |
| 6,160,999 A | 12/2000 | Chheda et al. | |
| 6,263,205 B1 | 7/2001 | Yamaura et al. | |
| 6,337,983 B1 | 1/2002 | Bonta et al. | |
| 6,721,564 B1 * | 4/2004 | Kobayashi | 455/436 |
| 2002/0198000 A1 * | 12/2002 | Voyer | 455/456 |

* cited by examiner

*Primary Examiner*—George Eng
*Assistant Examiner*—Wesley L Kim
(74) *Attorney, Agent, or Firm*—Alston & Bird LLP

(57) ABSTRACT

A method in a system including a mobile station, a group of active cells including a first serving cell and a second target cell and a controller of the active cells which switches forward link transmissions of data packets from the controller through the first serving cell to the mobile station to forward link transmission of data packets from the controller through a second cell to the mobile station. The method determines at the mobile station that switching of forward link transmissions should occur from the first serving cell to the second target cell while forward link transmission of data packets through the first serving cell to the mobile station are occurring; transmitting an indication to switch the forward link transmission of data packets to the second target cell from the mobile station to the controller; the controller in response to the indication switches the transmission of data packets from the first serving cell to the second target cell; and the second target cell transmits the data packets to the mobile station.

34 Claims, 5 Drawing Sheets

METHOD AND SYSTEM FOR FORWARD LINK CELL SWITCHING APPROACH WITHOUT ABIS TRAFFIC FLOODING

TECHNICAL FIELD

This invention relates to wireless high-speed packet data technology, e.g. in CDMA2000 1xEV-DV and 3GPP HSDPA and more specifically, to improving the cell switching techniques for forward radio channels.

BACKGROUND ART

Physical Layer ARQ (HARQ) and cell switching are two link-adaptation techniques that are employed by the 1xEV-DV forward link standard. Cells are comprised of base transceiver stations (BTS) in wireless environments which have lower traffic and sectors, which subtend an angular portion of a full periphery, such as 120°, in wireless environments having higher traffic.

The hybrid automatic repeat request (HARQ) protocol uses an adaptive automatic repeat request (ARQ) technique for retransmission combining.

Cell switching is a handoff technique that allows the mobile terminal (MS) to identify an optimal serving cell pilot channel based on C/I measurement with C/I being a strength ratio of the carrier signal to the interference.

In the 1XTREME/1xEV-DV proposal, fast cell site selection (FCSS) is proposed to ensure mobility. When a mobile moves from one cell to another cell, a central entity Network Convergence Function (NCF) is used to coordinate multiple cells in the active set. During soft handoff, a NCF provides the same data units (PDUs) to all of the cells in the active set (flooding). However, only one cell delivers the PDUs to the MS. When the MS moves from one cell to another in the active set, the MS echoes the most recently received NCF sequence number so that the new cell can resume the data transfer without delay.

1. FIG. 1 shows an example of a prior art cell switching operation. Cell a and cell b both are in the MS's active set. Prior to switching cell a sends the data frames to the MS by the Forward Shared Channel (F-SHCH). Upon a measurement threshold, the MS may decide to request new cell switching by sending a request on R-CCH to request cell switching to cell b. The serving cell a serves the MS, before the cell switching, with the forward and reverse link channels. The target cell b is the cell chosen for the transmission after the cell switching is completed. An active set for the Forward Packet Data Channel is updated to cell a based on the pilot strength feedback from the MS. All cells in the active set (only two have been illustrated for convenience purposes) are eligible for forward link cell switching.

In FIG. 1, the Abis interface (the Abis interface is between the base station controller (BSC) and the cells) flooding occurs during, for example, the soft handoff of 1XTREME/1xEV-DV FCSS procedure. This problem significantly affects the BSC and cell performance. During soft handoff, both Abis links between the BSC and cell a and cell b are active as indicated by the bidirectional arrows therebetween. Flooding involves substantial transmission overhead, memory requirement inside the cells and a centralized management entity which manages the large sequence frame numbering.

After the MS has signalled the BSC with an indication on R-CCH as indicated in FIG. 1 that the MS wants to switch receiving forward link transmissions from cell a to cell b, the BSC transmits the data packets simultaneously to both the serving and target cells until handoff is complete. The simultaneous use of the Abis resources by the BSC for the serving and target cells and the radio resources from the serving and target cells is wasteful especially when data rates are high such as for 1 xEV-DV (around 4 Mbps).

DISCLOSURE OF INVENTION

This invention is to a cell switching technique which avoids the prior art flooding of the forward link soft-handoff of FIG. 1. The avoidance of soft handoff provides the benefits of reducing the Abis interface overhead and quick resumption of data transfer and saves the radio resource from being loaded with unnecessary information. The cell-switching technique of the present invention permits base stations including 1xEV-DV cells to provide data users with better network resource utilization and quick resumption of data transfer after switching.

In a system including a mobile station, cells in an active set including first serving and second target cells and a controller of the active cells, a method of switching forward link transmissions of data packets from the controller through the first serving cell to the mobile station to forward link transmission of data packets from the controller through the second target cell to the mobile station in accordance with the invention includes determining at the mobile station that switching of the forward link transmission should occur from the first serving cell to the second target cell while the forward link transmission of the data packets through the first serving cell to the mobile station is occurring; transmitting an indication to switch the forward link transmission of the data packets from the mobile station to the controller; the controller, in response to the indication, switches the transmission of data packets from the first serving cell to the second target cell; and the second target cell transmits the data packets to the mobile station. The first cell may continue transmission of data packets on the forward link to the mobile station for a cell switch delay time period measured from the indication to switch until the completion of the switching. The mobile station may transmit a quality indicator to only the first serving cell during the cell switch delay which is used by the first serving cell to control at least one of a power level of transmission or selection of modulation and a coding type used by the forward link during the cell switch delay in transmitting data packets to the mobile station. The mobile station may transmit acknowledgment information to the first serving cell during the cell switch delay; and the first serving cell may retransmit on the forward link during the cell switch delay packets which were negatively acknowledged. The acknowledgment information may be either an acknowledgment or a negative acknowledgment that data packets of the forward link has been received by the mobile station. The second cell may transmit the data packets to the mobile station after expiration of a cell switch delay period measured from the indication to switch until the completion of the cell switching. The data packets may be transmitted from the cells to the mobile station on a forward shared channel (F-SHCH); and the indication to switch may be transmitted from the mobile station to the group of active cells on the reverse control channel (R-CCH) and a quality indicator may be sent on the reverse control channel to the first serving cell. F-SHCH may be mapped to a forward packet data channel (F-PDCH); and R-CCH may be mapped to a reverse acknowledgment channel (R-ACKCH) and a reverse channel quality indicator channel (R-CQICH). The cell switch delay may be one of zero or an integer multiple of a time frame interval required to transmit a data packet on the forward link. The cell switch delay may be determined or configured by the network dependent upon the servicing and target cells in the active set being between sectors or being in different base transceiver stations. The indication to switch may be a Walsh code cover of the second target cell base transceiver stations. The second target cell switches transmission of data packets to the mobile station at an end of a time including an additional time delay measured from an end of the cell switch delay period.

A system in accordance with the invention includes a mobile station, cells in an active set including first serving and second target cells, and a controller of the active cells, and wherein switching of forward link transmission of data packets from the controller through the first serving cell to the mobile station to forward link transmission of data packets from the controller through the second target cell to the mobile station occurs by determining at the mobile station that switching of forward link transmission should occur from the first serving cell to the second target cell while forward link transmission of the data packets through the first serving cell to the mobile station is occurring, transmitting an indication to switch the forward link transmission of the data packets from the mobile station to the controller, the controller in response to the indication switches the transmission of data packets from the first serving cell to the second target cell and the second target cell transmits the data packets to the mobile station. The first serving cell may continue transmission of data packets on the forward link to the mobile station for a cell switch delay time period measured from the indication to switch until the completion of the switching. The mobile station may transmit a quality indicator to only the first serving cell during the cell switch delay which is used by the first serving cell to control at least one of a power level of transmission or selection of modulation and coding type used by the forward link to the mobile station during the cell switch delay. The mobile station may transmit acknowledgment information to the first serving cell during the cell switch delay; and the first serving cell may retransmit on the forward link during the cell switch delay packets which were negatively acknowledged. The acknowledgment information may be either an acknowledgement or a negative acknowledgment that data packets of the forward link have been received by the mobile station. The second target cell may transmit the data packets to the mobile station after expiration of a cell switch delay period measured from the indication to switch until the completion of the switch. The data packets may be transmitted from the cells to the mobile station on a forward shared channel (F-SHCH); and the indication to switch may be transmitted from the mobile station to the second target cell on the reverse control channel (R-CCH) and a quality indicator may be sent on the reverse control channel to the first serving cell. The cell switch delay may be one of zero or an integer multiple of a time frame interval required to transmit a data packet on the forward link. The cell switch delay may be determined or configured by the network dependent upon the source and target pilots in the active set being between sectors within the same BTS or being in different base transceiver stations. The indication to switch may be a Walsh code cover of the second target cell. The second target cell switches transmission of data packets to the mobile station at an end of a time including an additional time delay measured from an end of the cell switch delay period.

BRIEF DESCRIPTION OF THE DRAWINGS

Like parts are identified by like identifications throughout the drawings.

BEST MODE FOR CARRYING OUT THE INVENTION

Forward Link Cell Switching

To reduce the Abis interface overhead during cell switching the invention:
1. Limits the data transfer from the BSC to only one cell at a time.
2. Moves buffered data from the serving (first) cell to the target (second) cell for fast data recovery during the switching period.
3. Optionally uses a new sequence numbering format with a bit field of fewer bits than the prior art or an existing radio link protocol (RLP) sequence number optionally may be utilized.

The present invention is useful for 1xEV-DV cell and MS implementation and is also related to 1xEV-DV standardization.

MS switching of data reception from cell to cell in accordance with the invention is described as follows. Each MS is assigned an active set of cells dynamically by the network. Data packets are sent on the forward shared channel (F-SHCH) and acknowledgements are sent on the reverse control channel (R-CCH). The indication to switch cells is sent on the R-CCH. For 1XTREME, R-CCH is mapped to the "Reverse Acknowledgement Indication Channel" (R-AISCH) and "Transmit Sector Indicator Channel" (R-TSICH). For 1xEV-DV, F-SHCH is mapped to the "Forward Packet Data Channel" (F-PDCH); R-CCH is mapped to "Reverse Acknowledgement Channel" (R-ACKCH); and "Reverse Channel Quality Indicator Channel" (R-CQICH).

The table below defines the timing relationships between T1 and T2 shown in FIG. 2 and described with reference to FIG. 3.

| | |
|---|---|
| T1 | The MS indicates cell switching to target cell b to invoke a cell switching procedure. |
| T2 | T1+ CSD where CSD is the cell switching delay required to ready target cell b for the packet data transmission when the R-CQICH transmissions are directed to target cell b after T2. |

Figure 2:
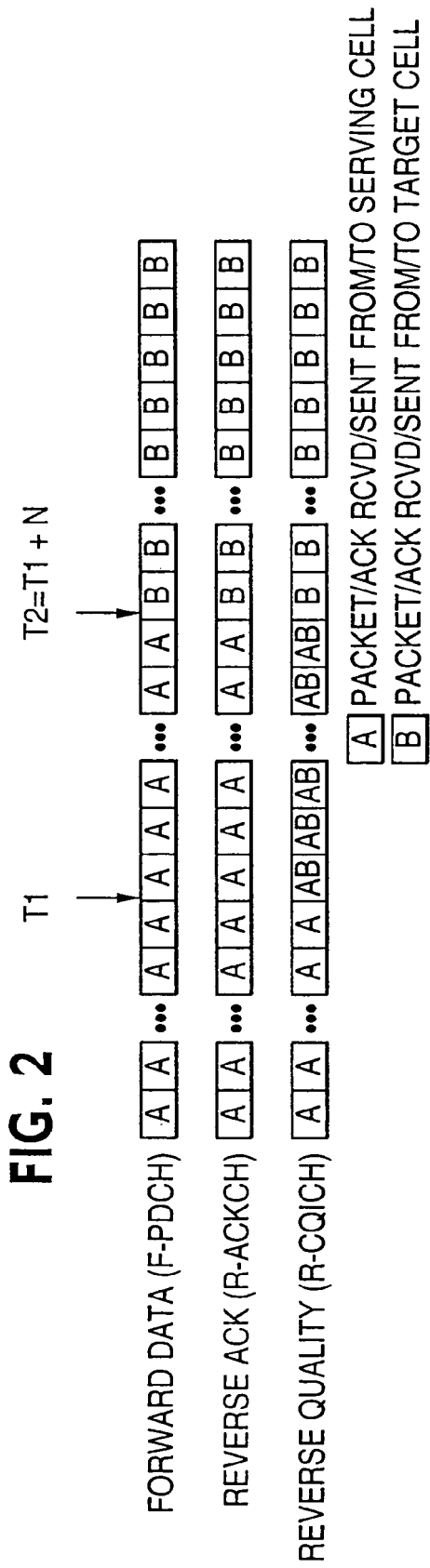
FIG. 2 is a diagram of forward link data transmission and reverse link feedback during the cell switching according to an embodiment of the present invention.
Figure 3:
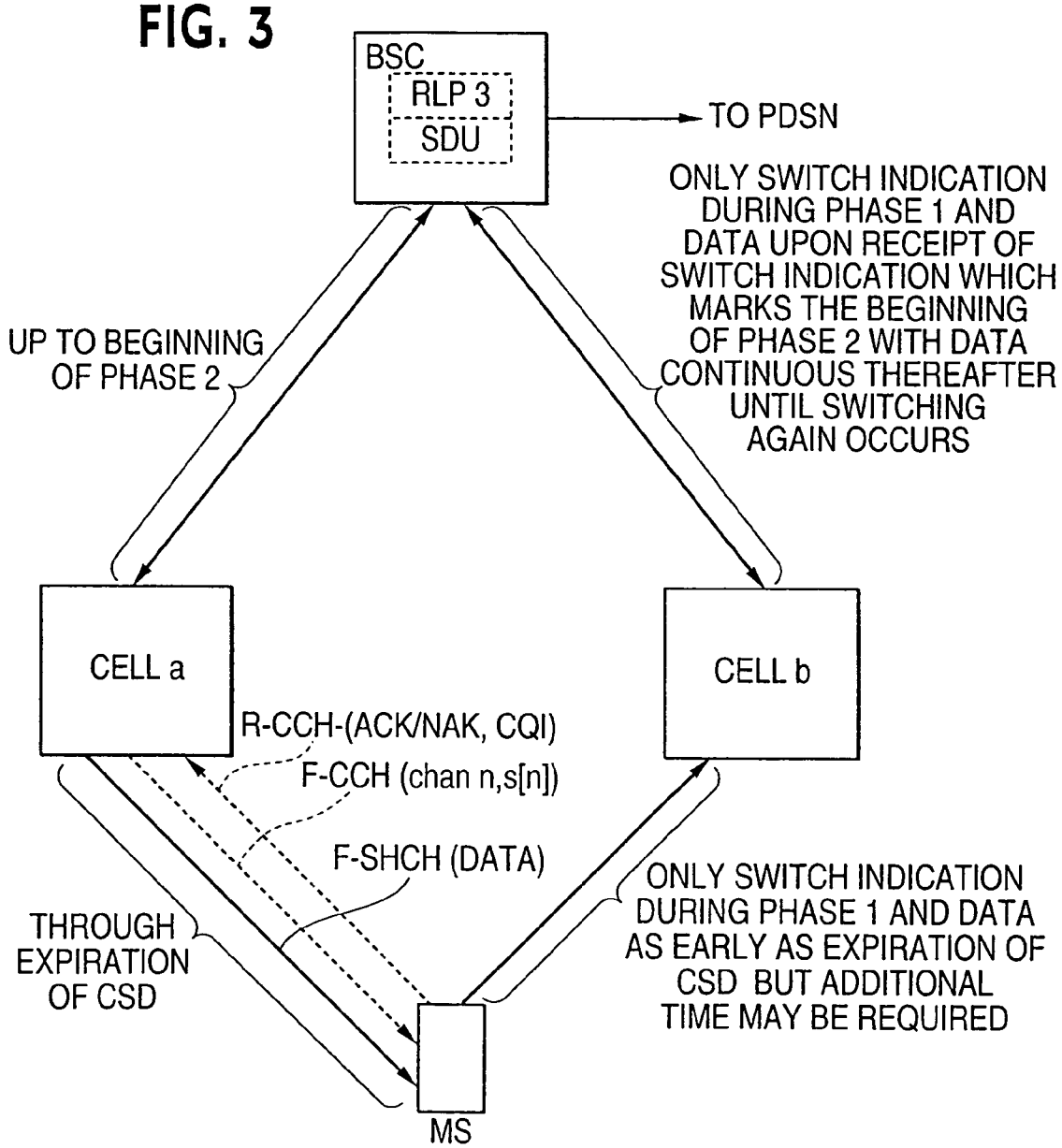
FIG. 3 is a diagram of communications between a base station controller, a first serving and a second target cell and a mobile station in accordance with the invention.

FIGS. 2 and 3 illustrates the transmission of data packets and acknowledgements during cell switching in accordance with the invention. There are three phases during the transition period:
1. Phase 1—Time duration before T1.
2. Phase 2—Time duration between T1 and T2.
3. Phase 3—Time duration after T2.

The table below describes three significant types of transmissions which head three columns entitled "BSC Sends Data to", "MS Receives Data from & Sends CQI" and "CELL that Decodes ACK/NAK" during the phases 1, 2 and 3 as defined above which row identifications therein.

|  | BSC Sends Data to | MS Receives Data from & Sends CQI to | CELL that Decodes ACK/NAK Responses |
|---|---|---|---|
| Phase 1 | CELL a | CELL a | CELL a |
| Phase 2 | CELL b | CELL a | CELL a |
| Phase 3 | CELL b | CELL b | CELL b |

Figure 1:
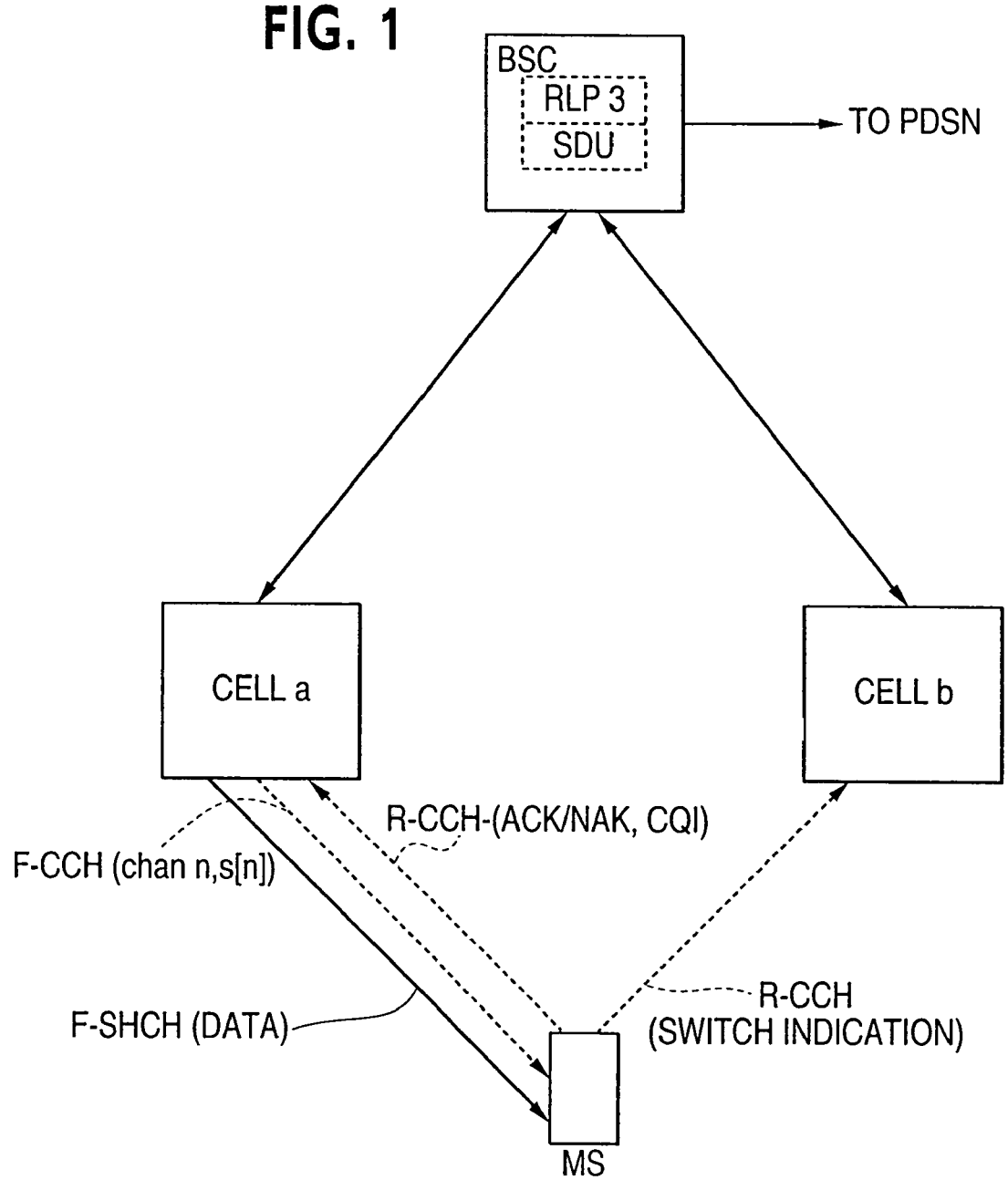
FIG. 1 is a diagram of a prior art forward link cell switching operation which floods the Abis interface.

Data transmission up to the end of phase 1 at time T1 when transmission of data packets occurs only to the first serving cell a. At the beginning of phase 2, the invention switches data packet transmission to second target cell b thus eliminating the flooding of the prior art in FIG. 1 when both Abis resources between the BSC and the first serving and second target cell are active. During the remainder of phase 2 and through phase 3, the data transmission continues from the BSC to target cell b. The MS receives data from and sends CQI to cell a all the way up to the end of phase 2 which is also the end of the CSD described below at which transmission is switched to target cell b. The transmission of CQI up to the end of phase 2 enables cell a to adjust power level on the forward link to continue to change signal strength in response to changing conditions or to select modulation and a coding type used on the forward link. Decoding of ACK/NAK transmissions occurs at serving cell a until the end of phase 2 at which time decoding of ACK/NAK transmissions switches to target cell b. The MS also receives any pending retransmitted frames from serving cell a up to the end of the CSD as described below. The unified sequence number or RLP Sequence Number may be used by target cell b to continue the new frame transmission after switching occurs. The frames sent during phase 1 cannot be retransmitted after entry into phase 3. In that case, the upper layer (e.g. RLP in the BSC) handles the retransmission of the erroneous frames.

The data packets are transmitted by the target (second) cell to the MS after the CSD. The CSD is required for the target cell to allocate network and radio resources and for the serving (first) cell to complete any pending data packet retransmissions and their acknowledgements. The CSD equals M*Xms where M is zero or a positive integer and X is a time duration of transmission of a data frame. The CSD time duration is between when the MS generates an indication for cell switching from target cell a to serving cell b is to occur and the time when the forward link packet data transmission is ready or occurs from the target cell (for example, cell b). If the target cell is not ready after the expiration of the CSD due to signaling delay or time latency, additional handoff delay time may be needed in addition to the CSD to complete the handoff to the target cell. However, in this circumstance, the data transmission between the serving cell and the MS indicated at time T2 at the end of phase 2 in FIG. 2 is dropped after expiration of the CSD regardless of whether the handoff is complete. The value of CSD can be determined or configured by the network depending upon the serving and target cells in the active set being between sectors or being in different base transceiver stations. The additional handoff delay is determined by the traffic load of the target cell and the transport capacity of the cells. The indication to switch may be a Walsh code cover of the second target cell.

FIG. 3 illustrates the sequence of transmissions between the BSC, serving cell a and target cell b and the MS. The forward link and reverse link transmissions occur between the BSC and the MS through serving cell a throughout phase 1. The reverse link transmission between the serving cell a and the BSC are only generally discussed to the extent necessary to understand the invention. The switch indication is transmitted from the MS to the active group of cells indicating that target cell b has been determined by the MS to be the target cell. The switch indication is represented by a Walsh cover of the target cell b. A Walsh cover is an identification of the cell b in the wireless system. Phase 1 ends when the indication to switch to target cell b is received by the BSC. At the beginning of phase 2, as indicated in the column of FIG. 2 entitled, "BSC Sends Data to", the transmission of forward link data to serving cell a switches to target cell b without the flooding of the Abis interface of the prior art. Data packet transmission on the forward link from serving cell a to the MS and CQI on the reverse link between the MS and the serving cell a occurs until the CSD time out at which time all transmissions between serving cell a and the MS stop. Transmission of the data from target cell b to the MS should begin at the end of the CSD which is normally the time for target cell b to be set up as the new serving cell and to acquire the necessary radio resources. If the CSD is not sufficient to complete the switch over to target cell b, nevertheless the MS ceases to receive data packets from serving cell a and the aforementioned additional time delay may be necessary to complete switching.

A New Sequence Numbering Format

In 1XTREME MAC layer, a sequence number is defined for the MuxPDU (Multiplex Sublayer Protocol Data Unit). This sequence number is used to synchronize buffer management and package retransmission during a fast cell site selection (FCSS). In the prior art 12 bits are defined for the sequence number. The length of the sequence number is coincidentally the same as the Radio Link Protocol (RLP) ARQ sequence length. The use of 12 bits may be an over specification for the purpose of HARQ. If RLP is used for the data transmission, the RLP sequence number can also be used for this purpose.

Since the main purpose of sequence numbering is to synchronize the serving cell and the target during switching, the switching period should be fast and completed within a few frames duration (e.g. 2 frames or Xms). For a worst case (e.g. 4 HARQ channels and 4 transmissions), 6 bits of sequence number length is sufficient with the switching sequence of the invention. This length reduction reduces traffic overhead over the air. Hence, the sequence number length may be reduced from 12 bits to 6 bits in the 1XEV-DV specifications if the RLP sequence number is not used.

The following procedures are used by the cells and MS according to the present invention.

Forward Link Cell Switching and Cell Procedures

The cell defines and initializes the following data structures. The cell is considered active for a MS when the cell has the MAC Identifier (MAC_ID) assigned for the MS and is decoding the signal quality CQI feedback received from the MS. For example, target cell b in FIGS. 2 and 3 is active in phase 3 and serving cell a is in transition in phase 2 and active in phase 1.

Figure 4:
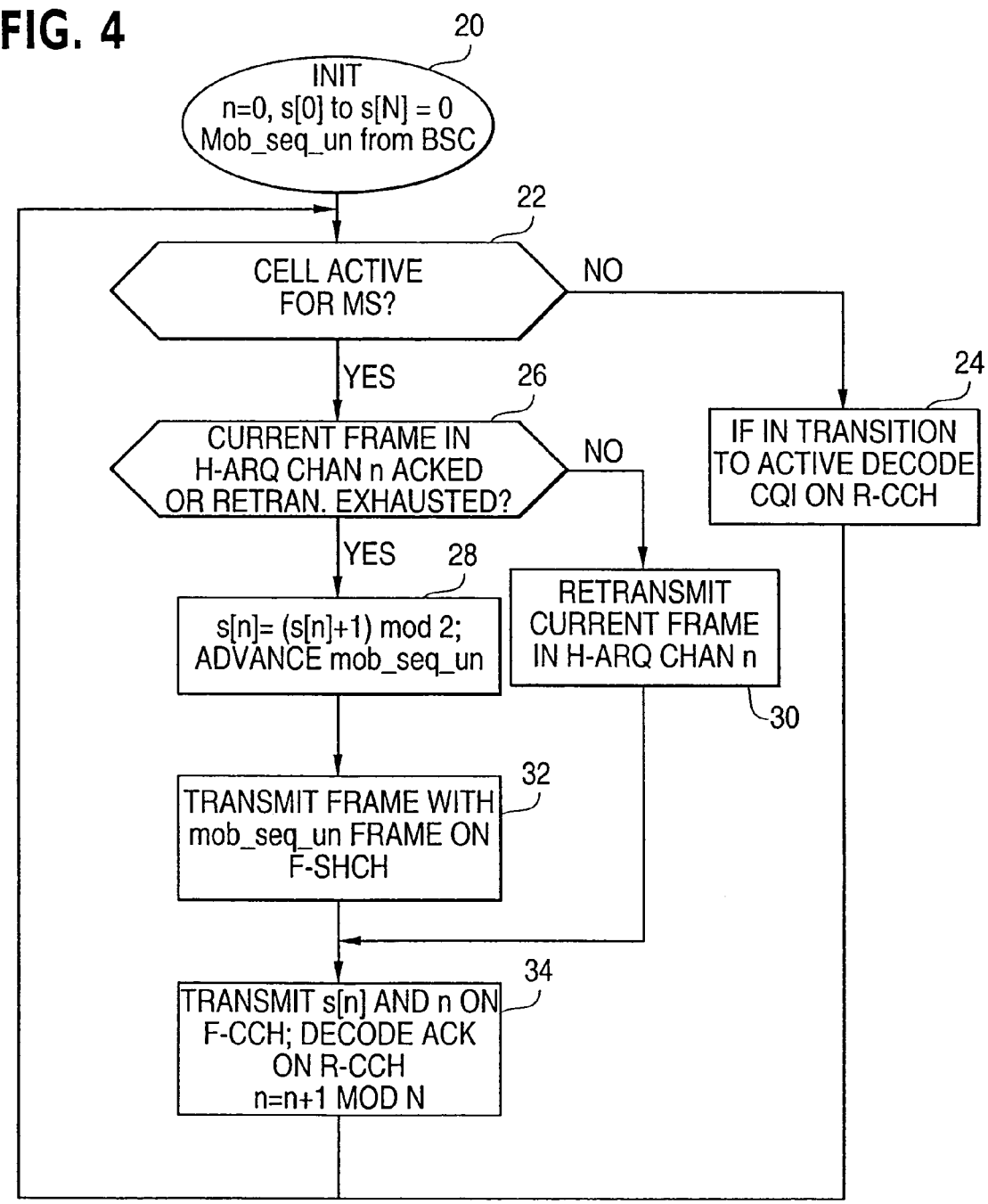
FIG. 4 is a flowchart of a cell processing according to an embodiment of the present invention.

With reference to FIG. 4, the serving cell a performs the operations therein every Transmission Time Interval (TTI) ms as long as there are packets to transmit. The cell operation starts at initialization point 20 wherein N=number of H-ARQ channels, mob_seq_un=unified sequence number (initialized by BSC), n=current H-ARQ channel being processed (initialized to 0) and int s[N]=one-bit H-ARQ channel sequence number (initialized to '0').

The cell operation proceeds to point 22 where a determination is made if the cell is active for the MS. If the answer is "no" at point 22, operation proceeds to point 24, where decoding the CQI and ACK/NAK sent on R-CCH by the MS occurs and operation proceeds back to point 22. If the cell is active at point 22, operation proceeds to point 26 wherein a determination is made if an ACK/NAK=1' was received from the previous transmission to the H-ARQ channel n, or if the maximum number of retransmissions has been exhausted. If the determination is "yes" at point 26, operation proceeds to point 28 where incrementing of the H-ARQ channel sequence number s(n) mod 2 and advance mob_seq_un occurs. If the determination is "no" at point 26, operation proceeds to point 30 where retransmission of the buffered frame associated with the current H-ARQ channel on the F-SHCH occurs. Operation proceeds from point 28 to point 32 wherein transmission of the encoded and modulated frame with the sequence number mob_seq_un occurs on F-SHCH. Operation proceeds from point 32 to point 34, from either of points 30 or 32 depending upon the previous determinations made at point 26, where transmission of the current H-ARQ sequence number s(n) on F-CCH occurs; decoding the ACK/NAK sent on the Reverse Control Channel from the MS occurs and incrementing of the H-ARQ channel n=n+1 mod N occurs.

Forward Link CSS MS Station Procedures

Figure 5:
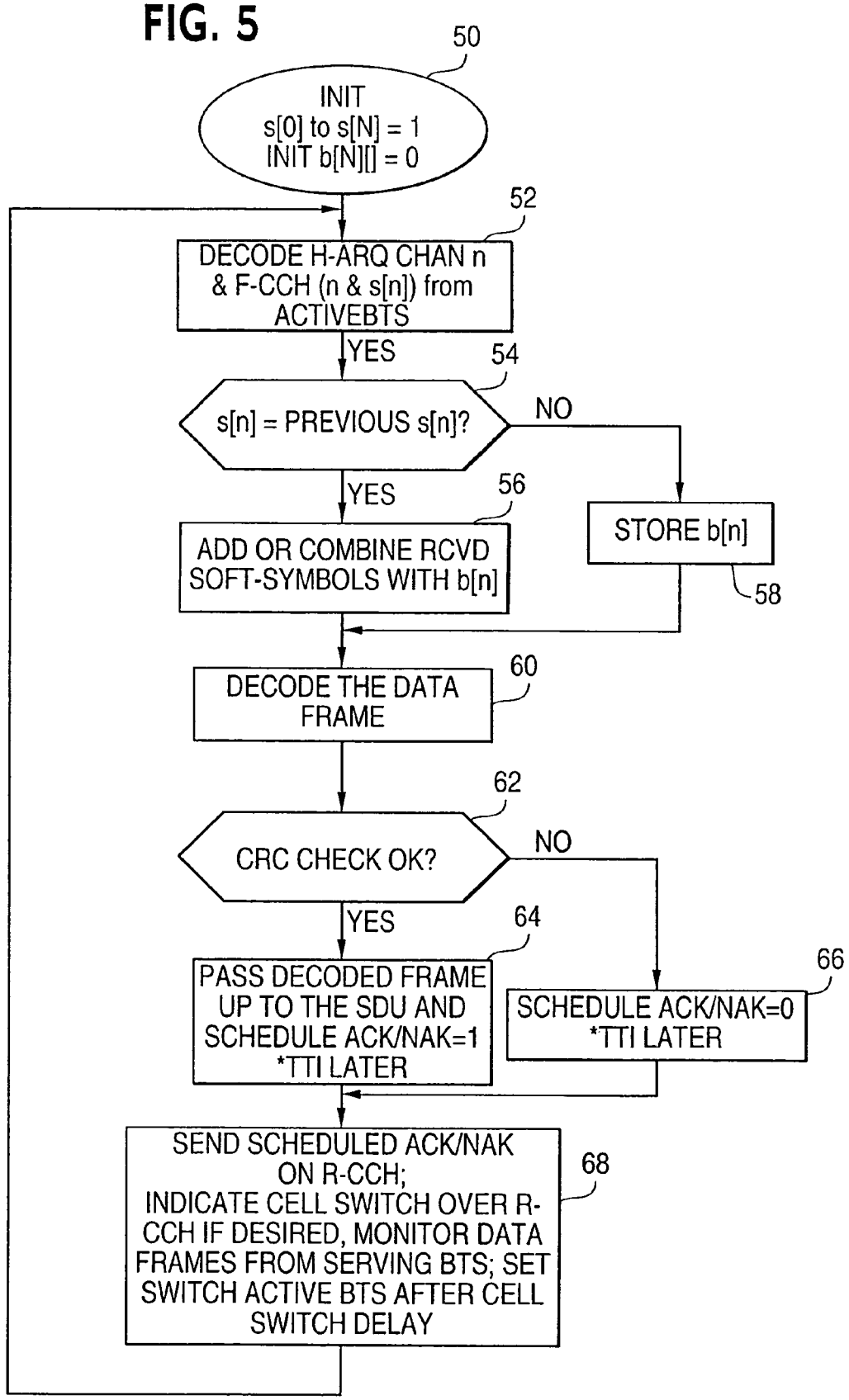
FIG. 5 is a flowchart of a MS processing according to an embodiment of the present invention.

The MS runs the operations of FIG. 5 every TTI ms. The following data structures are defined at initialization point 50: n=current H-ARQ channel, int s[N]=one-bit H-ARQ channel sequence number (initialized to '1'); float b[N][Interleaver Size]=H-ARQ channel soft-symbol buffer (initialized to '0'I and d=delay measured in units of TTI ms, between transmission of a H-ARQ channel on the Forward Link and the associated acknowledgement on the Reverse Link. The operation proceeds from initialization at point 50 to point 52 where decoding of the H-ARQ channel n and the associated sequence numbers [n] received on the Forward Control Channel (F-CCH) from the active cell occurs. The operation proceeds from point 52 to point 54 where determination is made if the H-ARQ channel sequence number s(n) is the same as the previous transmission. If the answer is "yes" at point 54, operation proceeds to point 56 where the received soft-symbols are added with the soft-symbols stored in b(n). If the answer is "no" at point 54, operation proceeds to point 58 where the new soft-symbols are stored into b(n). Operation proceeds form point 56 to point 60 where decoding the frame occurs. Operation proceeds to point 62 where a determination is made if the cyclic redundancy code is OK. If the answer is "yes" at point 62, operation proceeds to point 64 where the decoded frame is passed up to the selection and distributed unit in the BSC and scheduling of an ACK/NAK="1" occurs on the Reverse Control Channel (R-CCH)k*TTI ms frames later where k is a positive integer. If the answer is "no" at point 62, operation proceeds to point 66 where the decoded frame and scheduling an ACK/NAK='0' on the R-CCH k*TTI ms frames later occurs. Operation proceeds from points 64 and 66 to point 68 where any scheduled ACK/NAK is sent on the R-CCH; if the MS desires a cell switch, indication of the cell switching on the R-CCH for the target cell b occurs; if the MS indicates cell switching, the cells in the active set monitor of the R-CQICH transmissions for the target cell Walsh cover; and setting the target cell b to active after CSD, which is Xms, occurs. Operation then returns to point 52.

While the invention has been described in terms of its preferred embodiments, it should be understood that numerous modifications may be made thereto. It is intended that all such modifications fall within the scope of the appended claims.

What is claimed is:

1. A method comprising:
in response to a mobile station initiated determination that switching of transmission of data packets should occur from a first site to a second site, the second site being selected by the mobile station via serving sector selection from an active set, receiving an invocation initiating a switching process from the mobile station, the invocation including an indication to a controller to indicate a desire to switch the transmission of data packets from the first site to the second site and maintaining the transmission of data packets through the first site during the switching process, the switching process having a duration that is network configured as a delay time period and having a start that is initiated by the mobile station upon receipt of the indication; and
switching the transmission of data packets from the first site to the second site once the switching process is completed, as determined by the controller in response to the indication, such that data packets are only transmitted from the first site during the switching process and from the second site when the switching process is completed.

2. A method in accordance with claim 1 wherein:
the first site continues transmission of data packets for the delay time period, until the completion of the switching.

3. A method in accordance with claim 2 wherein:
the mobile station transmits the indication to the controller on a reverse link.

4. A method in accordance with claim 3 wherein:
the mobile station transmits a quality indicator to only the first site during the delay time period which is used by the first site to control at least one of a power level of transmission or selection of modulation and coding type used by the forward link during the delay time period in transmitting data packets to the mobile station.

5. A method in accordance with claims 3 wherein:
the mobile station transmits acknowledgment information to the first site during the delay time period; and
the first site retransmits data packets which were negatively acknowledged during the delay time period.

6. A method in accordance with claim 5 wherein:
the acknowledgment information is either an acknowledgment or a negative acknowledgment that data packets of the forward link have been received by the mobile station.

7. A method in accordance with claims 3 wherein:
the second site transmits the data packets to the mobile station after expiration of a delay time period which represents the completion of the switching.

8. A method in accordance with claims 7 wherein:
the second site switches transmission of data packets to the mobile station at an end of a time including an additional delay from the expiration of the delay time period.

9. A method in accordance with claim 2 wherein:
the delay time period is one of zero or an integer multiple of a time frame interval required to transmit a single data packet on a forward link.

10. A method in accordance with claim 2 wherein:
the delay time period is determined or configured dependent upon the first and second site in an active set being between sectors or being in different base transceiver stations or cells.

11. A method in accordance with claim 1 wherein:
the first site and the second site are both in an active set.
12. A method in accordance with claims 1 wherein:
the indication is transmitted to sites in an active set and a quality indicator is sent to the first site.
13. A method in accordance with claim 1 wherein:
the indication to switch is a cover of the second site.
14. An apparatus comprising:
a receiver that is configured to receive pilot signals and a processor that is configured to determine that switching of transmission of data packets should occur from a first site to a second site, the second site being selected by the mobile station via serving sector selection from an active set, the processor configured for initiating a switching process, responsive to a determination made by a mobile station, by invoking transmitting an indication to a network to indicate a desire to switch the transmission of data packets from the first site to the second site and maintaining the transmission of data packets through the first site during the switching process, such that data packets are only transmitted from the first site during the switching process and from the second site when the switching process is completed, wherein the indication is a cover pointing to the second site, and wherein the switching process has a duration that is network configured as a delay time period and has a start that is initiated by the mobile station upon receipt of the indication.
15. The apparatus of claim 14 wherein:
the receiver continues the reception of data packets from the first site for the delay time period, until the completion of the switching.
16. The apparatus of claim 14 wherein:
the apparatus transmits the indication to a controller on a reverse link.
17. The apparatus of claim 14 wherein:
the first site and the second site are both in an active set.
18. The apparatus of claim 14 wherein:
the apparatus transmits acknowledgement information to the first site during a delay time period.
19. The apparatus of claim 18 wherein:
the acknowledgement information is either an acknowledgement or a negative acknowledgement that data packets of a forward link have been received by the receiver.
20. The apparatus of claim 18 wherein:
the delay time period is one of zero or an integer multiple of a time frame interval required to transmit a single data packet on a forward link.
21. The apparatus of claim 14 wherein:
the indication is transmitted to the sites in an active set and a quality indicator is sent to the first site.
22. An apparatus comprising:
a mobile station configured to process an input signal to determine that switching of transmission of data packets should occur from a first site to a second site, the second site being selected by the mobile station via serving sector selection from an active set, the mobile station being further configured to initiate a switching process by generating an indication to indicate a desire for switching the transmission of data packets from the first site to the second site and maintaining the transmission of data packets through the first site during the switching process, such that data packets are only transmitted from the first site during the switching process and from the second site when the switching process is completed, wherein the indication is a cover pointing to the second site, wherein the switching process has a duration that is network configured as a delay time period and has a start that is initiated by the mobile station upon receipt of the indication.
23. The apparatus of claim 22 wherein:
the mobile station is configured to utilize the delay time period to control switching of data packets from the first site to the second site.
24. An apparatus comprising:
a receiver configured to receive an indication to indicate a desire to switch transmission of data packets from a first site to a second site, the indication being received from a mobile station that determined that the switch should occur, wherein the indication is a cover pointing to the second site, the second site being selected by the mobile station via serving sector selection from an active set; and
a controller configured to control switching of transmission of data packets from the first site to the second site and maintain the transmission of data packets through the first site during a switching process, such that data packets are only transmitted from the first site during the switching process and from the second site when the switching process is completed, wherein the switching is in response to the indication, and wherein the switching process has a duration that is network configured as a delay time period and has a start that is initiated by the mobile station upon receipt of the indication.
25. The apparatus of claim 24 wherein:
the first site and the second site are both in an active set.
26. The apparatus of claim 24 wherein:
the first site retransmits data packets which were negatively acknowledged during the delay time period.
27. The apparatus of claim 24 wherein:
the second site transmits the data packet to a mobile after expiration of the delay time period which represents completion of switching.
28. The apparatus of claim 24 wherein:
the first site continues transmission of data packets for the delay time period until completion of switching and the delay time period is one of zero or an integer multiple of a time frame interval required to transmit a single data packet on a forward link.
29. The apparatus of claim 24 wherein:
the first site continues transmission of data packets for the delay period until completion of switching and the delay time period is determined or configured dependent upon the first and second sites in an active set being between sectors or being in different base transceiver stations or cells.
30. The apparatus of claim 24 wherein:
the second site switches transmission of data packets to a mobile at an end of a time including an additional delay from expiration of the delay time period until completion of switching.
31. A method comprising:
receiving pilot signals;
determining, at a mobile station, that switching of transmission of data packets should occur from a first site to a second site, the second site being selected by the mobile station via serving sector selection from an active set; and
initiating a switching process by transmitting an indication to a network to indicate a desire to switch transmission of data packets from the first site to the second site and maintain the transmission of data packets through the first site during the switching process, such that data packets are only transmitted from the first site during the switching process and from the second site when the switching process is completed, wherein the indication is a cover pointing to the second site, and wherein the switching process has a duration that is network configured as a delay time period and has a start that is initiated by the mobile station upon receipt of the indication.

32. A method in accordance with claim 31 wherein:

the delay time period is provided to control switching of a data packets from the first site to the second site.

33. An apparatus comprising:

means for receiving pilot signals;

means for determining, at a mobile station, that switching of transmission of data packets should occur from a first site to a second site, the second site being selected by the mobile station via serving sector selection from an active set; and means for initiating a switching process by transmitting an indication to a network to indicate a desire to switch transmission of data packets from the first site to the second site and maintain the transmission of data packets through the first site during the switching process, such that data packets are only transmitted from the first site during the switching process and from the second site when the switching process is completed, wherein the indication is a cover pointing to the second site, and wherein the switching process has a duration that is network configured as a delay time period and has a start that is initiated by the mobile station upon receipt of the indication.

34. The apparatus of claim 33 comprising:

means for providing the delay time period to control switching of data packets from the first site to the second site.

* * * * *